(12) United States Patent
Jouper et al.

(10) Patent No.: US 9,438,043 B2
(45) Date of Patent: Sep. 6, 2016

(54) AIRPLANE CABIN ENVIRONMENT MANAGEMENT

(71) Applicant: Astronics Advanced Electronic Systems Corp., Kirkland, WA (US)

(72) Inventors: Jeffrey Jouper, Newcastle, WA (US); John S. Lamb, Bothell, WA (US)

(73) Assignee: Astronics Advanced Electronic Systems Corp., Kirkland, WA (US)

( * ) Notice: Subject to any disclaimer, the term of this patent is extended or adjusted under 35 U.S.C. 154(b) by 572 days.

(21) Appl. No.: 13/760,777

(22) Filed: Feb. 6, 2013

(65) Prior Publication Data

US 2014/0217811 A1    Aug. 7, 2014

(51) Int. Cl.
*H02J 3/14* (2006.01)
*H02J 4/00* (2006.01)
*H02J 3/00* (2006.01)
*H02J 3/38* (2006.01)

(52) U.S. Cl.
CPC ............. *H02J 4/00* (2013.01); *H02J 3/005* (2013.01); *H02J 2003/001* (2013.01); *H02J 2003/388* (2013.01); *Y04S 10/525* (2013.01); *Y10T 307/414* (2015.04)

(58) Field of Classification Search
CPC ............. H02J 3/00; H02J 1/00; H02J 4/00; H02J 5/005; H02J 7/025; H02J 3/14; H02J 7/007; H02J 17/00; H02J 7/0042; H02J 7/0052; H02J 13/0006; H02J 1/08; H02J 1/10; H02J 2003/143; H02J 3/32
USPC .......................................................... 307/31
See application file for complete search history.

(56) References Cited

U.S. PATENT DOCUMENTS

| | | | |
|---|---|---|---|
| 4,747,041 A * | 5/1988 | Engel et al. .................. 713/324 |
| 5,754,445 A | 5/1998 | Jouper et al. |
| 6,046,513 A * | 4/2000 | Jouper et al. .................. 307/31 |
| 6,629,428 B1 | 10/2003 | Murry |
| 6,664,656 B2 * | 12/2003 | Bernier ......................... 307/9.1 |
| 7,564,147 B2 * | 7/2009 | Michalko ........................ 307/44 |
| 8,209,101 B2 * | 6/2012 | Breit .............................. 701/80 |
| 8,237,308 B2 * | 8/2012 | Atkey et al. .................. 307/31 |
| 8,295,065 B2 | 10/2012 | Jouper |
| 8,307,224 B2 | 11/2012 | Conroy et al. |
| 8,548,713 B2 * | 10/2013 | Self et al. ..................... 701/100 |
| 2004/0021371 A1 * | 2/2004 | Jouper ........................... 307/29 |
| 2007/0296273 A1 * | 12/2007 | Reitmann et al. ............. 307/34 |
| 2010/0170262 A1 | 7/2010 | Kaslusky et al. |
| 2012/0013177 A1 | 1/2012 | Krenz et al. |
| 2012/0139341 A1 | 6/2012 | Jouper |

\* cited by examiner

*Primary Examiner* — Jared Fureman
*Assistant Examiner* — Esayas Yeshaw
(74) *Attorney, Agent, or Firm* — Wiggin and Dana LLP; Gregory S. Rosenblatt; Jonathan D. Hall

(57) ABSTRACT

A system has a power source connected to power access points and at least one environmental control system. A threshold compare device is effective to compare the proportional load on the environmental control systems to a preset threshold. If the threshold is exceeded, unused power access points are disabled. This prevents such access points from placing additional loads on the environmental control systems. Conversely, when the proportional load on the environmental control systems drops below a preset threshold, power can be restored to the disabled power access points. A master control unit can monitor the load on the environmental control systems and either or both the environmental conditions in environment zones or the power loading of the power access points and determine whether to disable unused power outlets.

16 Claims, 4 Drawing Sheets

AIRPLANE CABIN ENVIRONMENT MANAGEMENT

CROSS REFERENCE TO RELATED APPLICATION(S)

N.A.

U.S. GOVERNMENT RIGHTS

N.A.

BACKGROUND OF THE INVENTION

1. Field

Disclosed here in is a method to manage the load on an environmental control system. In particular, the utilization of power access points is restricted to manage the load on the environmental control system of a controlled environment, such as the cabin of an airplane.

2. Description of the Related Art

There are environments where the demand for power can exceed a limited available supply. This problem is particularly acute when power supply is transient. For example, aircraft generators driven by engines will often produce power at less than their maximum capability. Load Distribution and Management Systems (LDMSs) can ensure that that power demand does not exceed power supply by allocating power to certain systems and denying it to others.

On aircraft, the use of consumer power outlets and other electronic devices, such as in-flight entertainment systems, can draw significant amounts of power. Such power loads can cause power demand to exceed power supply, especially when an aircraft's power generator is not producing power at its maximum capacity. Systems for managing power in such limited power environments have been previously disclosed. For example, the LDMS disclosed in U.S. Pat. No. 5,754,445, titled "Load Distribution and Management System," by Jouper et al., manages power on-board aircraft by restricting the power available to passengers for personal electronic devices. The U.S. Pat. No. 5,754,445 is incorporated by reference herein in its entirety.

Analogous problems to those described above occur in situations where environmental control systems (ECSs) are used to control environmental conditions. When an ECS is required to maintain a specific environmental condition in adverse operating conditions, additional loads on the ECS can cause the ECS's capacity to be impermissibly exceeded. For example, an aircraft ECS acting to maintain a stable and acceptable temperature in an aircraft operating in adverse conditions, such as a hot environment, will be stressed by additional thermal loads. Management of ECS loading is advantageous for several reasons. For example, overloading an ECS can damage it. In aircraft, passenger comfort may be adversely affected by an ECS's inability to maintain a reasonable temperature due to the ECS's capacity being exceeding. Federal Aviation Administration regulations also require aircraft cabin environments to be kept within a specified temperature range. Increased temperatures in an aircraft can also lead to the premature failure and operational degradation of various systems.

Installed ECSs possess a maximum capacity, which often corresponds to a worst-case loading scenario. This maximum capacity will typically be an element of an aircraft's initial design, updated with the inclusion or allowance of new systems that will add additional loads to the aircraft's ECS. In such cases the aircraft's ECS must then be re-evaluated and updated to reflect the possibility of additional loads in a worst-case loading scenario. Especially where the additional loads are highly transient, as with the addition of consumer power outlets that may or may not be in use at any given time, the ECS will be oversized during normal operating conditions because it must be capable of handling the more onerous worst-case loading scenario. A disadvantage of this situation is that the size and weight of the ECS, and thus the overall weight of the aircraft and its fuel consumption, are increased, even though these increases provide limited benefit during normal operating conditions.

The use of consumer power outlets and other consumer electronics such as in-flight entertainment devices can place significant additional thermal loads on an aircraft's ECS. As previously explained, an aircraft's ECS must be sized to accommodate the worst-case loading scenario in which all of these electronics are used simultaneously while the ECS is also stressed by other conditions, such as a high ambient temperature. There remains, therefore, a need for a method and system to manage an ECS, so that the size and weight of the ECS may be relatively low, while still maintaining consumer access to power outlets and other electronic devices during normal operating conditions.

BRIEF SUMMARY

The details of one or more embodiments are set forth in the accompanying drawings and the description below. Other features, objects and advantages will be apparent from the description and drawings, and from the claims.

Disclosed herein is a system that disables the availability of power to electric outlets and electronics so as to prevent additional thermal loads from being placed on an ECS that is under stress. One advantage of the present disclosure is that the overall capacity of an ECS, and thus its size and weight, can be relatively lower, while still maintaining consumer access to power outlets and other electronic devices during normal operating conditions.

The disclosed systems and methods function to manage additional loads placed on ECSs by the utilization of power access points. Unused power access points are disabled when the load on the ECS, as a load proportional to its maximum load, exceeds a particular threshold. Forbidding the utilization of unused power access points prevents the creation of additional thermal loads that may otherwise cause the ECS to be overloaded. Alternatively, the power drawn from power access points or measurements of environmental conditions, or both, can be utilized in addition to the proportion load on the ECS to determine whether unused power access points should be disabled.

DETAILED DESCRIPTION

Figure 1:
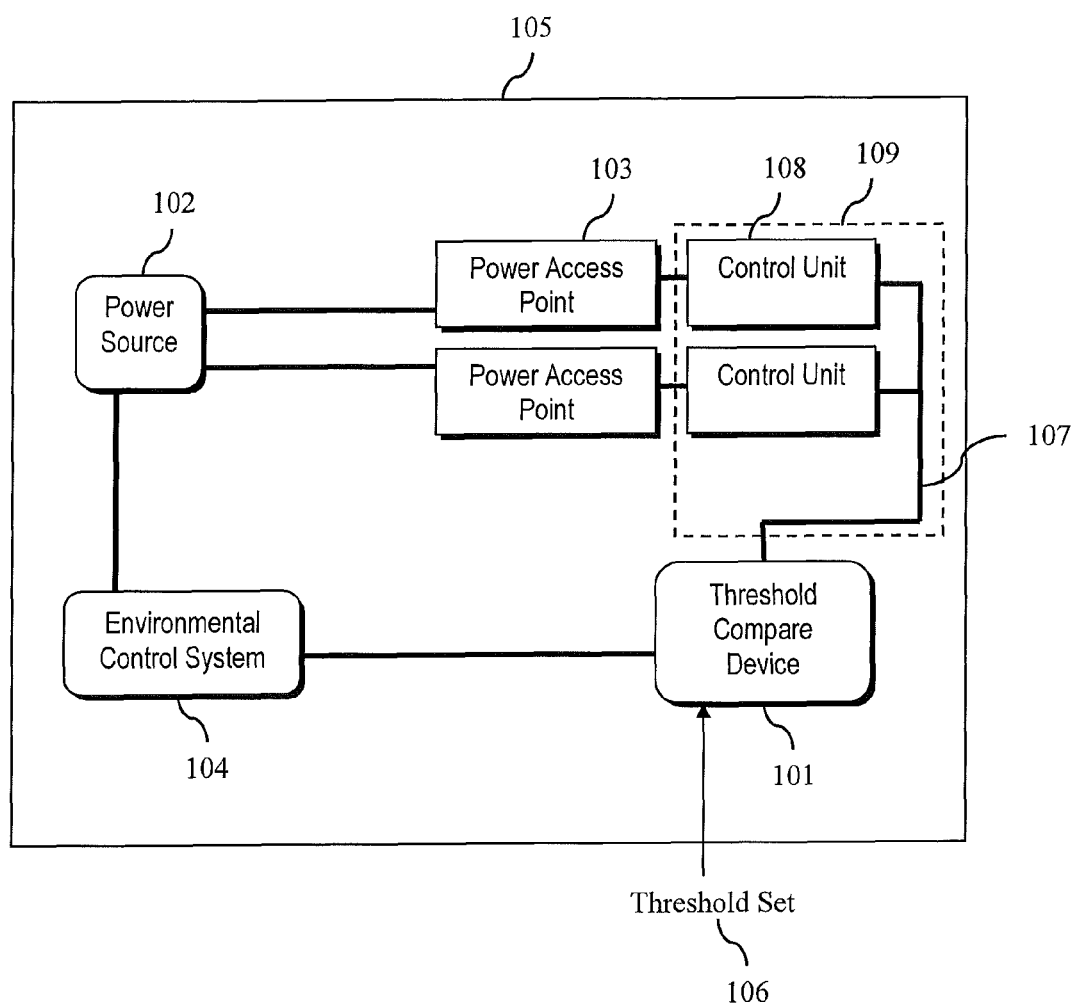
FIG. 1 is a schematic illustrating an embodiment of the disclosed system including a single environmental control system, power access points, and a device to determine whether unused power access points should be disabled.

Disclosed is a system for and method of managing the load on an ECS or ECSs. A system's power source delivers power to power access points and to an environmental control system or systems. The power source may be a generator driven by an aircraft engine. Power access points can be optionally grouped, with each group being connected to the power source through a switch or series of devices. For example, in an aircraft, each passenger seat may have an individual outlet for the consumer, with each row of seats being connected to the power source through a single device.

The proportional load on an ECS can be defined as the load on the ECS relative to a ceiling value, such as the ECS's maximum capacity. A control output representing the proportional load can be monitored. Such an output can, without limitation, optionally take the form of a linear function or a step function. This proportional control output can be compared to a preset threshold. The threshold can be preset by a variety of means and can be any chosen value. If the threshold is exceeded, unused power access points are disabled, preventing those power access points from being utilized and adding additional thermal loads on the ECS. In an aircraft, the load on the ECS can be controlled by preventing users in the cabin from utilizing then currently unused power access points, such as consumer power outlets. When the proportional control output drops below the threshold, power can be restored to the disabled power access points.

Additionally, a sensor or sensors can be used to monitor the environment controlled by the ECS. Optionally, different zones of the environment can be defined for monitoring and control. The power draw on the power access points, individually, in groups or as a whole, can also be measured. All or some of these measurements can optionally be utilized by a master control unit to control when unused power access points could be disabled. For example, a maximum thermal load could be entered into a master control unit as a system maximum load and the load on the ECS and temperature monitors can be evaluated based on the system maximum. When this system maximum is reached, additional thermal loads caused by the use of power access points are precluded by sending a limit signal to all unused power access points. This in turn limits the thermal load on the aircraft ECS system to less than the maximum output of the ECS. When the maximum thermal load is less than the system maximum, power is restored to the disabled power access points because the ECS can then accept additional thermal loads.

Various methods can be utilized to signal and disable unused power access points. For example, phase rotation among various power lines as disclosed by U.S. Pat. No. 8,295,065, titled, "System Control by Use of Phase Rotation Signaling" can optionally be used. The U.S. Pat. No. 8,295,065 is incorporated by reference herein in its entirety.

The disclosed system presents several advantages. The system mitigates the need to increase the size of an ECS when additional power access points are included. A smaller and less costly ECS can be utilized than would otherwise be necessary because additional thermal loads are prevented when the ECS is operating under stressing conditions. The additional weight saved by a smaller ECS is also advantageous, especially in vehicles such as aircraft.

FIG. 1 depicts a schematic of a system utilizing a threshold compare device 101. Power source 102 supplies power to power access points 103 and environmental control system 104, which acts to control environment 105. The environment can optionally be enclosed, as in the case of an airplane cabin. Power access points 103 may be consumer electrical outlets capable of powering consumer electronics, or other electronic devices such as aircraft in-flight entertainment units. Threshold compare device 101 measures the load that environmental control system 104 is under. If that load exceeds a preset threshold 106 then threshold compare device 101 sends a disable signal along control line 107 to control units 108. The disable signal can take many different forms, including without limitation the sending or withholding of power in control line 107, the phase rotation of power traveling through multiple power lines, or instructional data such as a binary command. Together, control line 107 and control units 108 form sub-system 109, the purpose of which is to manage power availability for power access points. In the embodiment, when control units 108 receive a disable signal, each determines if the power access point under the unit's control are in use. Control units 108 disable power access points 103 that are not in use. If the load on environmental control system 104 drops below preset threshold 106, then threshold compare device 101 sends an enable signal along control line 107 to control units 108. Control units 108 then restore power to disabled power access points 103. The enable signal can utilize the same mechanisms as the disable signal to effectuate this re-enabling. Sub-system 109 can take many different forms. Optionally, multiple control lines can be used or one control unit can manage multiple power access points.

Figure 2:
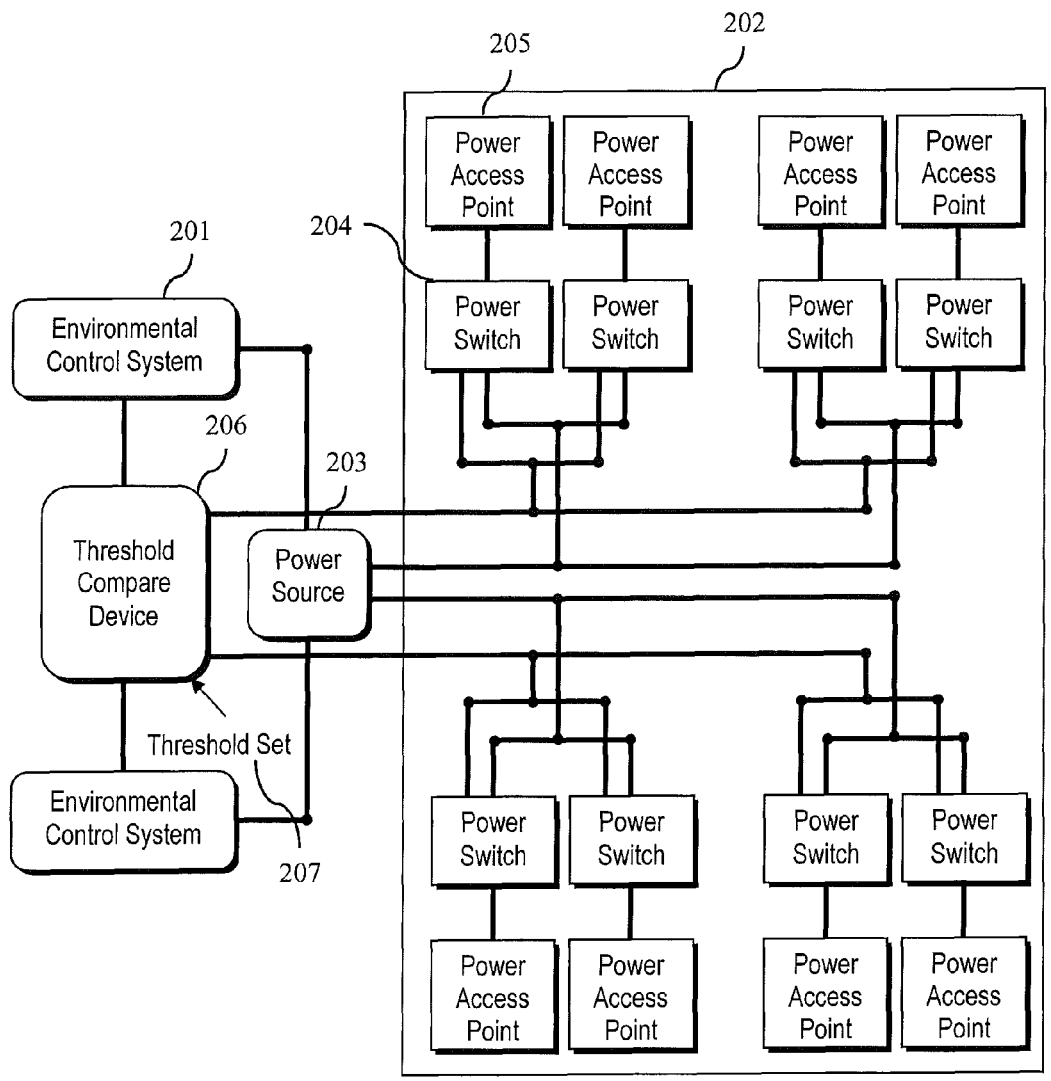
FIG. 2 is a schematic illustrating an embodiment of the disclosed system including multiple environmental control systems and grouped power access points.

FIG. 2 depicts a schematic of a system having multiple environmental control systems 201 operating to control environment 202. Power source 203 delivers power to environmental control systems 201. In this particular embodiment, power source 203 also delivers power to power switches 204, each of which is connected to a power access point 205. Threshold compare device 206 receives a control output of the proportional loads that environmental control systems 201 are under. If that load exceeds a set threshold 207 then threshold compare device 206 signals power switches 204 to disable power access points 205 that are not in use.

Figure 3:
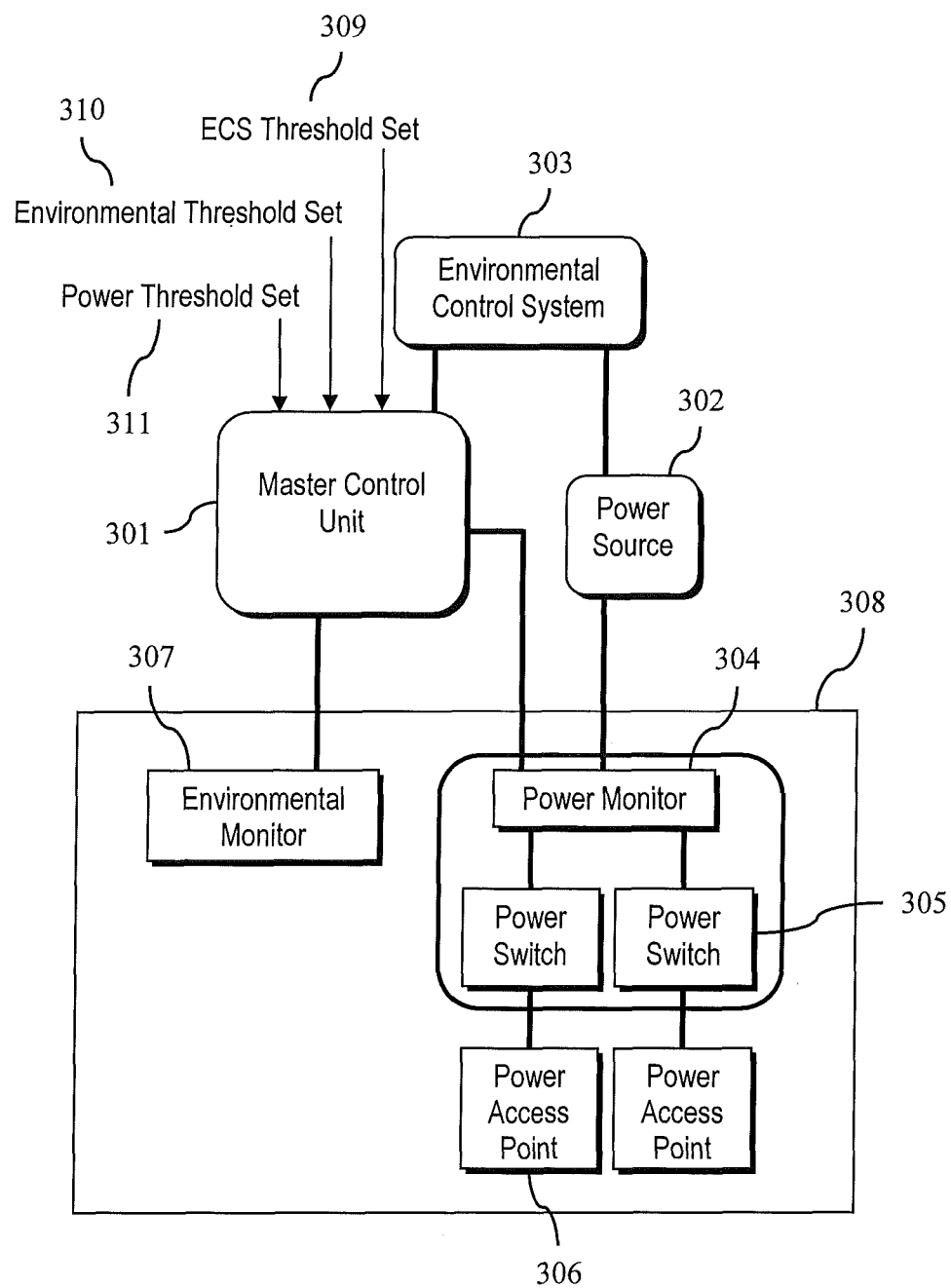
FIG. 3 is a schematic illustrating an embodiment of the disclosed system wherein a master control unit receives input from an environmental control system, an environmental monitoring device monitoring an environment and a power monitoring unit in order to determine whether unused power access points should be disabled.

FIG. 3 depicts a schematic of a system including a master control unit 301. Power source 302 delivers power to environmental control system 303. In this particular embodiment, power source 302 also delivers power through power monitor 304, which is connected to power switches 305, to power access points 306. The summation of the power draw of power access points 306 can be described as the total power draw. Environmental monitor 307 measures an environmental condition within environment 308. Such environmental conditions could include temperature, rate of temperature increase, ozone content, and the like. Alternatively, environmental monitor 307 could measure multiple environmental conditions or multiple environmental monitors could measure various environmental conditions within environment 308. In this embodiment, master control unit 301 receives inputs from power monitor 304, environmental monitor 306 and environmental control system 303. Alternatively, master control unit 301 can measure the electrical load on environmental control system 303 and inputs from either environmental monitor 307 or power monitor 304. Master control unit 301 compares the total power draw of power access points 306, as determined by power monitor 304, to a power threshold 311, the input from environmental monitor 307 to an environmental threshold 310, and the load on environmental control system 303 to an ECS threshold 309. If any condition exceeds its corresponding threshold, then master control unit 301 signals through power monitor 304 to power switches 305 that any power access points 306 that are not being used should be disabled. Alternatively, the system can compare one or more of the conditions.

Figure 4:
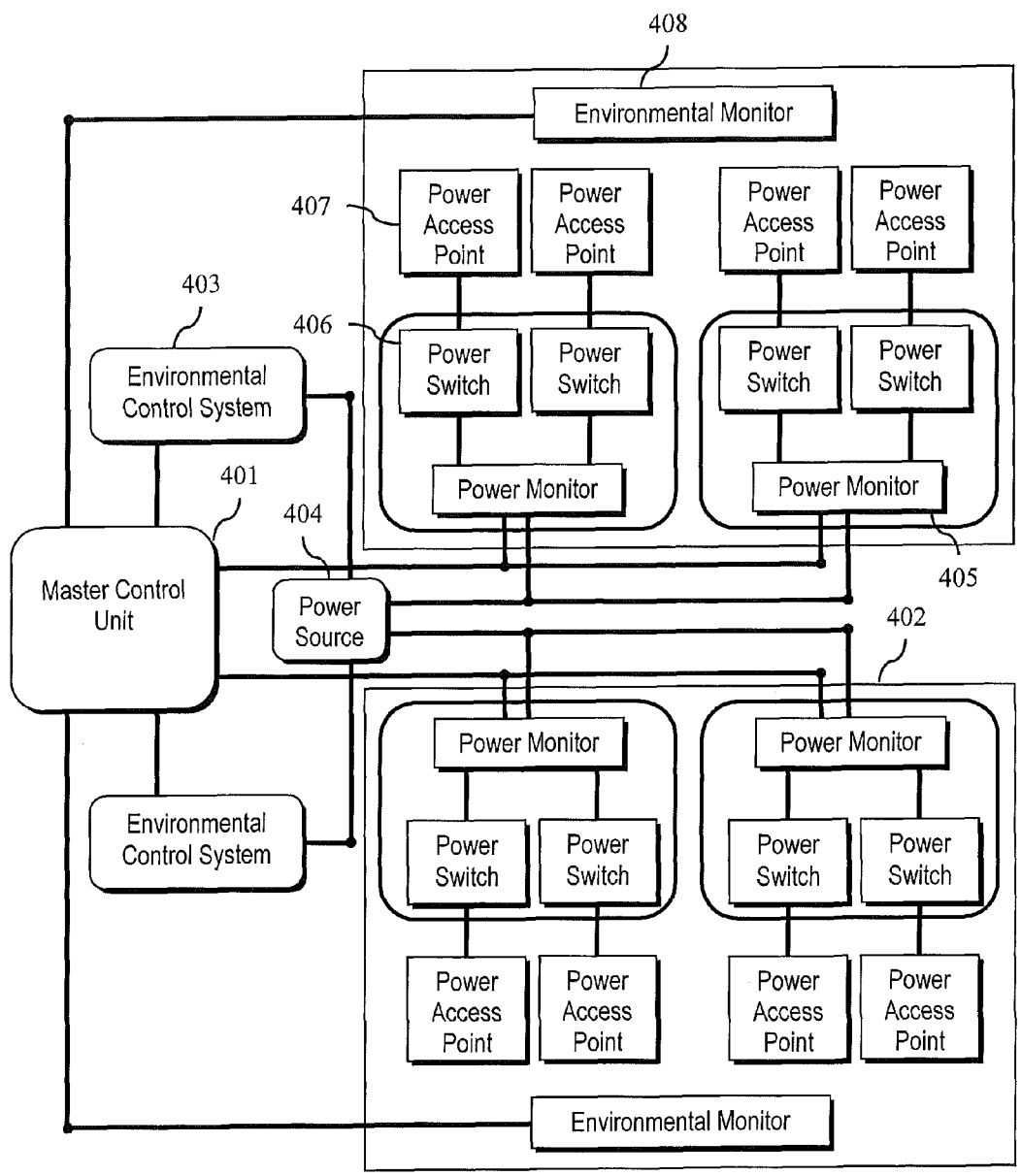
FIG. 4 is a schematic illustrating an embodiment of the invention having multiple environmental control systems, multiple environment zones, and an illustrative example of device grouping.

FIG. 4 depicts a schematic of a system with a master control unit 401, multiple environmental zones 402 and multiple environmental control systems 403. Any number of environmental zones can alternatively be used. Such environmental zones could be bounded by a physical boundary (such as an airtight membrane) or be multiple areas of one larger environment, without necessarily being precluded from overlapping. Power source 404 delivers power through power monitors 405, each connected to multiple power switches 406, to multiple power access points 407. Environmental monitors 408 each monitor the temperature of one of the environment zones 402. The master control unit 401 determines the total thermal load on environmental control systems 403 using input from environmental control systems 403, environmental monitors 408 and power monitors 405. If master control unit 401 determines that a preset total thermal load is exceeded, unused power access points 407 are disabled.

One or more embodiments of the present invention have been described. Nevertheless, it will be understood that various modifications may be made without departing from the spirit and scope of the invention. Accordingly, other embodiments are within the scope of the following claims.

We claim:

1. A system, comprising:
   a power source;
   a plurality of power access points and at least one environmental control system both connected to said power source;
   wherein the environmental control system is configured to control temperature;
   a threshold compare device effective to compare a proportional load on said environmental control system to a preset threshold and create a disable signal if said proportional load exceeds said preset threshold; and
   a sub-system effective to disable ones of said plurality of power access points not in use in response to said disable signal.

2. The system of claim 1, wherein said threshold compare device is effective to create an enable signal if said proportional load drops below said preset threshold; and
   said sub-system is effective to enable said disabled power access points in response to said enable signal.

3. The system of claim 1 wherein said power source is a generator driven by an aircraft engine.

4. The system of claim 1 wherein said at least one environmental control system is two environmental control systems.

5. The system of claim 1 wherein said power access points are consumer electrical outlets.

6. A method to manage the load on one or more environmental control systems, comprising the steps of:
   providing power from a power source to a plurality of power access points and to at least one of said environmental control systems;
   wherein the environmental control systems are configured to control temperature;
   comparing a proportional load on said environmental control system to a preset threshold; and
   disabling ones of said plurality of power access points not in use if said proportional load exceeds said preset threshold.

7. The method of claim 6 wherein the step of providing power from a power source is accomplished using a generator driven by an aircraft engine.

8. The method of claim 6 wherein said power access points are consumer electrical outlets.

9. A load distribution and management system (LDMS), comprising:
   a power source;
   a plurality of power access points connected to said power source;
   at least one environmental control system connected to said power source that is under a proportional load and configured to control temperature;
   a device effective to take an environmental condition measurement of at least one environmental condition of an environment;
   said environmental condition measurement having a corresponding preset threshold;
   a master control unit capable of monitoring statuses including said environmental condition measurement and comparing said status to its said corresponding preset threshold and creating a disable signal if said compared status is equal to or exceeds its said corresponding preset threshold; and
   a sub-system effective to disable said ones of said plurality of power access points not in use in response to said disable signal.

10. The LDMS of claim 9 wherein said environment is a substantially enclosed environment.

11. The LDMS of claim 10 wherein said substantially enclosed environment-contains at least two zones and said environmental conditions are the temperatures of said zones.

12. The LDMS of claim 9 wherein said at least one environmental control system is two environmental control systems.

13. A method to manage a load distribution, comprising the steps of:
   providing power from a power source to a plurality of power access points and to at least one environmental control system under a proportional load and configured to control temperature;
   measuring using a sensor at least one environmental condition of an environment;
   monitoring statuses of said proportional load and said environmental condition;
   comparing at least one said monitored status to a corresponding preset threshold; and
   disabling ones of said plurality of power access points not in use if said monitored status is equal to or exceeds said corresponding preset threshold.

14. The method of claim 13 wherein said environment is a substantially enclosed environment having at least one zone and said environmental conditions are the temperatures of said zones.

15. The method of claim 13 wherein the step of providing power is accomplished using a generator driven by an aircraft engine.

16. The method of claim 13 wherein said power access points are consumer electrical outlets.

* * * * *